United States Patent
Weaver (10) Patent No.: US 9,916,932 B1
(45) Date of Patent: Mar. 13, 2018

(54) SPACER FOR CAST CAPACITORS

(75) Inventor: Thomas Lyman Weaver, Webster Groves, MO (US)

(73) Assignee: THE BOEING COMPANY, Chicago, IL (US)

( * ) Notice: Subject to any disclaimer, the term of this patent is extended or adjusted under 35 U.S.C. 154(b) by 1125 days.

(21) Appl. No.: 13/217,075

(22) Filed: Aug. 24, 2011

(51) Int. Cl.
    *H01G 4/22* (2006.01)

(52) U.S. Cl.
    CPC ..................... *H01G 4/22* (2013.01)

(58) Field of Classification Search
    CPC ............ H01G 4/22; H01G 4/221; H01G 4/20
    USPC ............... 361/321.1, 311, 314, 315
    See application file for complete search history.

(56) References Cited

U.S. PATENT DOCUMENTS

| | | | | |
|---|---|---|---|---|
| 2,947,927 A | * | 8/1960 | Tracy ........................... | 361/327 |
| 3,086,149 A | * | 4/1963 | Baron .......................... | 361/301.3 |
| 3,480,846 A | * | 11/1969 | Mathes ........................ | 361/276 |
| 3,649,892 A | * | 3/1972 | Booe ............................ | 361/313 |
| 3,967,051 A | * | 6/1976 | Moore et al. ................ | 174/143 |
| 4,538,205 A | * | 8/1985 | Lavene ........................ | 361/308.2 |
| 5,144,536 A | * | 9/1992 | Tsukada et al. ............. | 361/765 |
| 6,616,794 B2 | * | 9/2003 | Hartman et al. ............ | 156/306.9 |
| 6,876,537 B2 | * | 4/2005 | Takahara et al. ........... | 361/321.2 |
| 2002/0184745 A1 | * | 12/2002 | Ringdahl ..................... | 29/25.42 |

OTHER PUBLICATIONS

Cao et al., "Nanostructured Dielectric Materials", 2010 International Conference on Solid Dielectrics, Potsdam, Germany, Jul. 4, 2010, pp. 1-4.

Domonkos et al., "Submicrosecond Pulsed Power Capacitors Based on Novel Ceramic Technologies", IEEE Transactionns on Plasma Science, vol. 38, No. 10, Oct. 2010, pp. 2686-2693.

* cited by examiner

*Primary Examiner* — David M Sinclair
(74) *Attorney, Agent, or Firm* — Yee & Associates, P.C.

(57) ABSTRACT

A method and apparatus for storing energy. An apparatus comprises a first plate, a second plate, and a spacer. The spacer comprises a material having a plurality of pores, being open pores. The spacer is located between the first plate and the second plate. The apparatus further includes an enclosure, the first plate, the second plate, and the spacer located within the enclosure, the enclosure defining a volume, wherein the enclosure further defines a wall, and further comprising a second spacer disposed between the wall and one of the first plate and the second plate.

20 Claims, 10 Drawing Sheets

SPACER FOR CAST CAPACITORS

BACKGROUND INFORMATION

1. Field

The present disclosure relates generally to energy storage. More particularly, the present disclosure relates to energy storage in a capacitor structure. Still more particularly, the present disclosure relates to the use of spacers to provide rapid charging and discharging in a high voltage capacitor.

2. Background

Energy storage in the form of an electrical potential has many applications and uses. Capacitors are one example of such energy storage. Various capacitor designs have been implemented for relatively lower voltage values. However, as the voltage stored in a storage device increases, the devices are subject to failure. Breakdown in an energy storage device, such as a capacitor, occurs at a voltage where the voltage potential fails to be maintained as desired.

Breakdown can be caused by a variety of reasons. Material shortcomings can limit the physical ability of materials to store energy. Manufacturing limitations and shortcomings also lead to breakdown where components are not manufactured or assembled to design criteria. In the example of a parallel plate capacitor, specific points of the parallel plates may be more closely positioned to each other than other areas on the plate. At these points of relative closeness, the electric field may be increased in intensity, which can lead to a point of increased current between plates and eventual breakdown.

As a result, the application and usage of capacitors in a higher-energy environment has been limited. Accordingly, it would be advantageous to have a method and apparatus that takes into account one or more of the issues discussed above, as well as possibly other issues.

SUMMARY

In one advantageous embodiment, an apparatus comprises a first plate, a second plate, and a spacer. The spacer comprises a material having a plurality of pores, being open pores, and is located between the first plate and the second plate.

In another advantageous embodiment, a capacitor comprises an anode plate and a cathode plate. A ceramic foam spacer is located between the anode plate and the cathode plate so as to position the anode plate and the cathode plate at a substantially even distance along an area of the anode plate and the cathode plate. The anode plate, the cathode plate, and the ceramic foam spacer are located within an enclosure, which defines a volume. A dielectric material is located within the volume of the enclosure and within pores of the spacer.

In still a further advantageous embodiment, a method is provided for manufacturing a capacitor. A spacer is positioned between a first plate and a second plate and is characterized by an open-pored material having a plurality of pores. An enclosure is filled with a dielectric material. The spacer, the first plate, and the second plate are positioned within the enclosure. Pores of the spacer are filled with the dielectric material.

In still a further advantageous embodiment, a method for manufacturing a capacitor is provided. A spacer is positioned between a first plate and a second plate of the capacitor. The spacer has pores. A dielectric material is formed within the spacer.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof will best be understood by reference to the following detailed description of an advantageous embodiment of the present disclosure when read in conjunction with the accompanying drawings, wherein:

DETAILED DESCRIPTION

Figure 1:
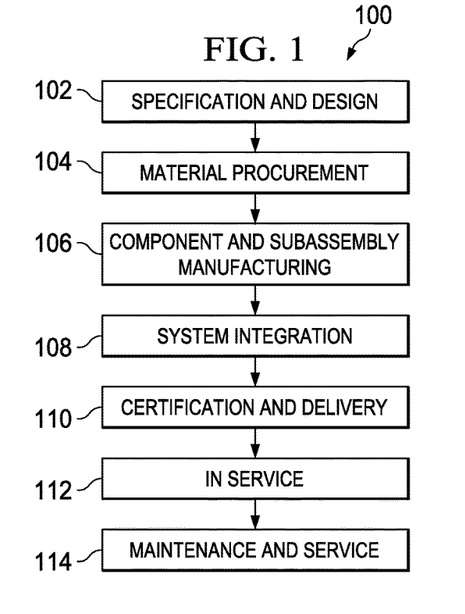
FIG. 1 is an illustration of an aircraft manufacturing and service method in accordance with an advantageous embodiment.
Figure 2:
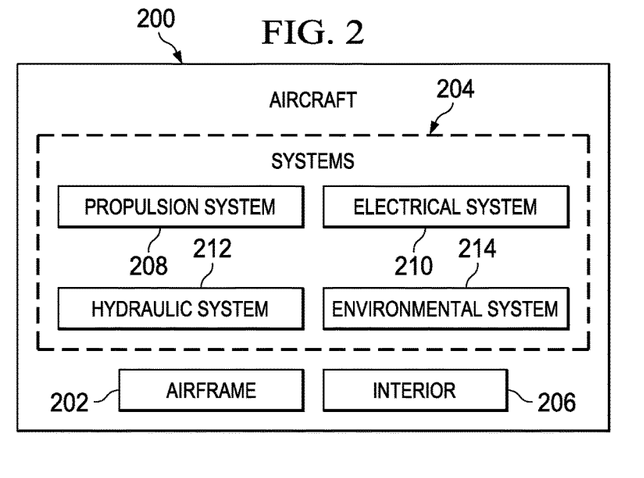
FIG. 2 is an illustration of an aircraft in accordance with an advantageous embodiment.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and/or other types of operators.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatuses and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments is one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of and/or reduce the cost of aircraft 200.

The different advantageous embodiments recognize and take into account a number of different considerations. For example, the different advantageous embodiments recognize and take into account that energy storage, such as the storage of voltage potential in a capacitor, is affected by the physical design and implementation of the capacitor. In the example of a parallel plate capacitor, or similar such capacitor, the spacing between the plates affects various performance parameters of the capacitor. An uneven spacing between the plates can lead to premature failure and/or undesired performance of the capacitor as the capacitor reaches its breakdown limit. As the amount of stored energy increases, it is further desired to provide an even spacing between storage plates. The even spacing of the storage plate may allow for a performance of the capacitor with a desired rate in charging and discharging while also avoiding breakdown.

The different advantageous embodiments also recognize and take into account that uneven spacing can lead to breakdown. For example, a breakdown may occur in capacitors where an electrical field is a bit stronger at a certain point over an area of a plate in the capacitor. The electrical field at that point can then cause a breakdown of the electrical field. At a point of breakdown, the dielectric material may demonstrate increased conductance. Sparking and plasma jumping may then occur between plates, which can lead to a failure point in the capacitor.

The different advantageous embodiments also recognize and take into account that a growing need is present to store a large level of energy in a relatively small volume, a storage characterized by high energy density. Further, there is a need to provide this in an airborne vehicle, such as an aircraft. Further, the different advantageous embodiments also recognize and take into account that a need is present for an energy storage device having a level of impedance that allows for a desired speed or rate in charging and discharging of a capacitor.

Certain designs have suffered from poor performance due to uneven spacing of capacitor plates. This situation may arise from poor casting control when dielectric material is added to and cured in a capacitor volume.

Thus, the different advantageous embodiments provide a method and apparatus for spacing storage plates in a capacitor. An apparatus comprises an enclosure with at least two plates positioned therein. A spacer comprising a ceramic foam material is interposed between the plates so as to maintain them at a substantially even spacing. A dielectric material fills the area between the two plates and also substantially fills the open area in the ceramic foam spacer. Open pores in the ceramic foam spacer provide an open volume in the spacer such that when the dielectric material fills the pores, the dielectric performance of the spacer matches the dielectric performance of the dielectric material itself to a desired degree.

Figure 3:
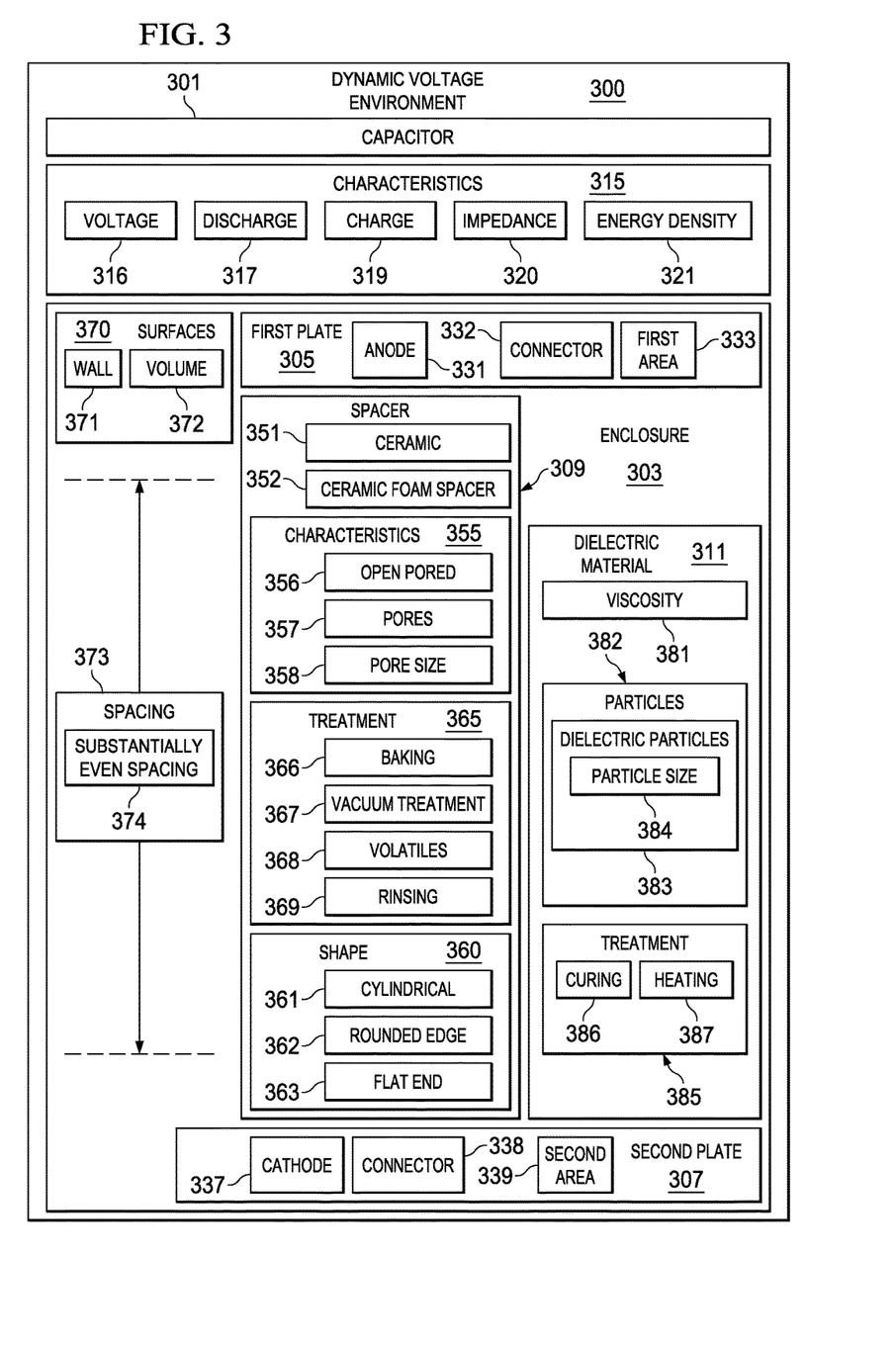
FIG. 3 is an illustration of a block diagram of a dynamic voltage environment in accordance with an advantageous embodiment.

With reference now to FIG. 3, an illustration of a block diagram of a dynamic voltage environment is depicted in accordance with an advantageous embodiment. In this example, dynamic voltage environment 300 may comprise capacitor 301. Capacitor 301 may include enclosure 303, first plate 305, second plate 307, spacer 309, and dielectric material 311.

Capacitor 301 may include one or more of characteristics 315. Characteristics 315 may include voltage 316, discharge 317, charge 319, impedance 320, and energy density 321. Voltage 316 may be greater than about 10,000 volts, at which level it is sometimes referred to as high voltage. Additionally, capacitor 301 may operate with a rate of charge 319 from about one microsecond to about 10 milliseconds. Similarly, capacitor 301 may operate with a rate of discharge 317 from less than about one microsecond to about one millisecond. A capacitor with such voltage capability may also be referred to as a high voltage capacitor. Capacitor 301 includes impedance 320 that allows for discharge 317 and charge 319 of voltage 316 at a desired level, such as described above. Charge 319 and discharge 317 of voltage 316, at a level above about 10,000 volts, may be sufficiently rapid so as to allow capacitor 301 to function in desired applications, such as, for example, military systems or radar systems. Values, such as that for impedance 320, may be designed so as to vary the rate of discharge 317 and charge 319. Energy density 321 may be about two joules/cm³ in one embodiment. Energy density at such a level may be referred to as a high energy density capacitor.

Enclosure 303 provides a structure in which other components of capacitor 301 may be positioned. Enclosure 303 includes surfaces 370 that define volume 372. In one embodiment, enclosure 303 may comprise a generally rectangular-shaped structure having an interior chamber that defines volume 372, although other shapes and configurations are possible. Enclosure 303 may include wall 371 as part of its structure. Wall 371 may be one of a bottom, a side wall, or a top. Enclosure 303 may include openings or apertures (not depicted in FIG. 3) to allow for the placement of connecting wires from the exterior of enclosure 303 to the interior. Enclosure 303 and volume 372 also provide a space to hold dielectric material 311, and thus, enclosure 303 may be a sufficiently air-tight or fluid-tight chamber so as to allow for the loading and curing of dielectric material 311 as further described herein. Enclosure 303 may be constructed of different materials including metallic and metal alloy materials.

First plate 305 and second plate 307 may be positioned within enclosure 303. Capacitor 301 may also include additional plates beyond first plate 305 and second plate 307. First plate 305 and second plate 307 may take various configurations.

First plate 305 and second plate 307 may be configured to be substantially planar and set apart at spacing 373. A substantially planar configuration with even spacing can reduce impedance and reduce induced magnetic fields between first plate 305 and second plate 307. A parallel plate configuration is, therefore, generally advantageous, because it has a lower inductance value compared to other configurations. The parallel plate, with an evenly spaced configuration, may be selected where capacitor 301 operates at voltage 316 equal to or greater than about 10,000 volts. The parallel plate configuration also may be selected where it is desired to achieve charge 319 and discharge 317 at a rate of from less than about one microsecond to about 10 microseconds.

First plate 305 may define first area 333, and second plate 307 may define second area 339. Spacing 373 may be substantially even spacing 374 across first area 333 and second area 339. In one advantageous embodiment, substantially even spacing 374 comprises a distance between first plate 305 and second plate 307 that varies by less than about one millimeter over first area 333 of first plate 305 and second area 339 of second plate 307. First plate 305 and second plate 307 may comprise different kinds of materials, including metallic and metal alloy materials.

First plate 305 and second plate 307 are configured to receive voltage 316. Voltage 316 may be charged and discharged across first plate 305 and second plate 307. First plate 305 and second plate 307 each receive either a positive or a negative charge. In one configuration, first plate 305 comprises anode 331, and second plate 307 comprises cathode 337. Capacitor 301 may also include connector 332 attached to first plate 305 and connector 338 attached to second plate 307 that allow for transfer of a current and voltage 316 into and out of capacitor 301.

Spacer 309 may be interposed between first plate 305 and second plate 307. More than one spacer 309 may be used to maintain first plate 305 and second plate 307 at substantially even spacing 374. Spacer 309 comprises a material of ceramic 351. Further, spacer 309 comprises ceramic foam spacer 352.

Ceramic foam spacer 352 includes characteristics 355. Characteristics 355 of ceramic foam spacer 352 include that ceramic foam spacer 352 has pores 357 that are open pored 356. Open pored 356 means that ceramic foam spacer 352 is sufficiently porous so as to receive dielectric material 311, as further described herein, such that dielectric material 311 is substantially distributed through ceramic foam spacer 352 in a substantially even manner.

Pores 357 may be characterized by pore size 358 that may be, for example, an average pore size or a distribution of pore sizes. Individual pores may vary in size from one to another. Pores 357 and pore size 358 define a porosity for ceramic foam spacer 352. In one aspect, ceramic foam spacer 352 may include an open volume of about 85 percent or higher. In other words, open volume comprises about 85 percent or more of the total ceramic foam volume. In another advantageous embodiment, the open volume may comprise more than about 90 percent of the total spacer volume.

Ceramic foam spacer 352 may be constructed from a variety of materials. For example, the materials may include aluminum compounds and silicon compounds, such as alumina, silica, and/or silicon carbide. Other materials include aluminum silicates, boron compounds, zirconium compounds, titanium compounds, and oxides thereof.

Spacer 309 may also be characterized by shape 360. In one embodiment, shape 360 of spacer 309 is substantially cylindrical 361. Further, spacer 309 includes a substantially flat end 363. Flat end 363 may be positioned on two opposing ends of spacer 309. Flat end 363 is configured to make substantially even contact with first plate 305 and second plate 307. At the edge where the cylindrical surface transitions to flat end 363, the edge is substantially rounded edge 362.

While not binding the disclosure to any particular theory, it is believed that shape 360 of spacer 309 as cylindrical 361 with rounded edge 362 may assist in the performance of capacitor 301. Shape 360 is selected so as to avoid or minimize sharp edges and corners. It is further believed that edges and corners may provide physical paths that develop areas of increased conductivity. These areas of increased conductivity can lead to capacitor breakdown.

Spacer 309 may also be subjected to treatment 365. In one embodiment, treatment 365 occurs prior to the positioning of spacer 309 within capacitor 301. Treatment 365 may include baking 366 of spacer 309. Baking 366 comprises heating spacer 309 at an elevated temperature for a desired period of time. In one embodiment, baking 366 comprises heating spacer 309 at a temperature of between about 200 degrees Celsius to about 600 degrees Celsius for up to about six hours. Other temperatures and time periods may be used. Treatment 365 may also include vacuum treatment 367. Vacuum treatment 367 includes exposing spacer 309 to a vacuum for a period of time. In one advantageous embodiment, vacuum treatment 367 occurs concurrently with baking 366.

Treatment 365 may also include rinsing 369. Rinsing 369 includes washing or rinsing spacer 309 with a solvent so as to remove particles, impurities, and foreign matter from the surfaces of spacer 309. Rinsing 369 may itself leave a residue, which can be removed by baking 366.

Treatment 365 is conducted so as to remove materials, such as water and impurities, in or on spacer 309. Impurities may include volatile materials in or on spacer 309. Treatment 365 may be conducted so as to include volatiles 368 and can improve performance of capacitor 301. Volatiles 368 and/or other impurities on the surface of spacer 309 can negatively affect the performance of capacitor 301. For example, water molecules positioned on the surface of spacer 309 can provide an electric pathway that leads to capacitor breakdown.

Capacitor 301 may also include dielectric material 311. Dielectric material 311 comprises any of the known materials used as a dielectric in a capacitor. Dielectric material may comprise, by way of example only, polypropylene compounds and polyimide compounds. Polyimide compounds may also be used with nanoparticles of ceramics, such as barium titanite or silica. Polyvinylidine fluoride bases with various copolymers may also be used. Dielectric material 311 may be a fluid characterized by viscosity 381.

Dielectric material 311 may also include dielectric particles 383 dispersed within a fluid dielectric material 311. In these illustrative examples, particles 382 are dielectric particles 383. Dielectric particles 383 are materials that improve the performance of dielectric material 311. Dielectric particles 383 are characterized by particle size 384. Generally, particle size 384 does not exceed pore size 358 so that dielectric particles 383 can be evenly dispersed within spacer 309.

Dielectric material 311 may be positioned within enclosure 303 so as to substantially fill volume 372. Dielectric material 311 may also substantially surround first plate 305 and second plate 307. As is known in the art, dielectric material 311 can interact with first plate 305 and second plate 307 so as to improve or enhance the performance of capacitor 301.

Dielectric material 311 may also undergo treatment 385. Treatment 385 of dielectric material 311 may include curing 386 of dielectric material 311 such that dielectric material 311 sets or hardens. Curing 386 of dielectric material 311 may include heating 387 of dielectric material 311. During treatment 385 and, depending on the kind of material selected, dielectric material 311 may undergo a transition so as to change from a viscous, liquid material to a solid or substantially solidified material.

The illustration of dynamic voltage environment 300 in FIG. 3 is not meant to imply physical or architectural limitations to the manner in which an advantageous embodiment may be implemented. Other components in addition to and/or in place of the ones illustrated may be used. Some components may be unnecessary. Additionally, the blocks are presented to illustrate some functional components. One or more of these blocks may be combined and/or divided into different blocks when implemented in an advantageous embodiment.

In an advantageous embodiment, capacitor 301 includes enclosure 303 that defines volume 372. First plate 305 and second plate 307, each being substantially planar, are positioned within volume 372. At least one spacer 309 is positioned between first plate 305 and second plate 307, and spacer 309 maintains first plate 305 and second plate 307 at substantially even spacing 374. Flat end 363 of spacer 309 is in contact with each of first plate 305 and second plate 307.

Dielectric material 311 is positioned within volume 372. Dielectric material 311 is also positioned so as to substantially fill pores 357 of spacer 309. Dielectric material 311 may be cured so as to transition to a substantially solid form. Connector 332, which is attached to first plate 305, and connector 338, which is attached to second plate 307, allows voltage 316 to discharge 317 and charge 319 first plate 305 and second plate 307. Capacitor 301 may discharge 317 and charge 319 voltage 316 that is at least about 10,000 volts. Capacitor 301 may also operate with a rate of discharge 317 from less than about one microsecond to about 10 microseconds and with a rate of charge 319 from about one microsecond to about 10 milliseconds.

Figure 4:
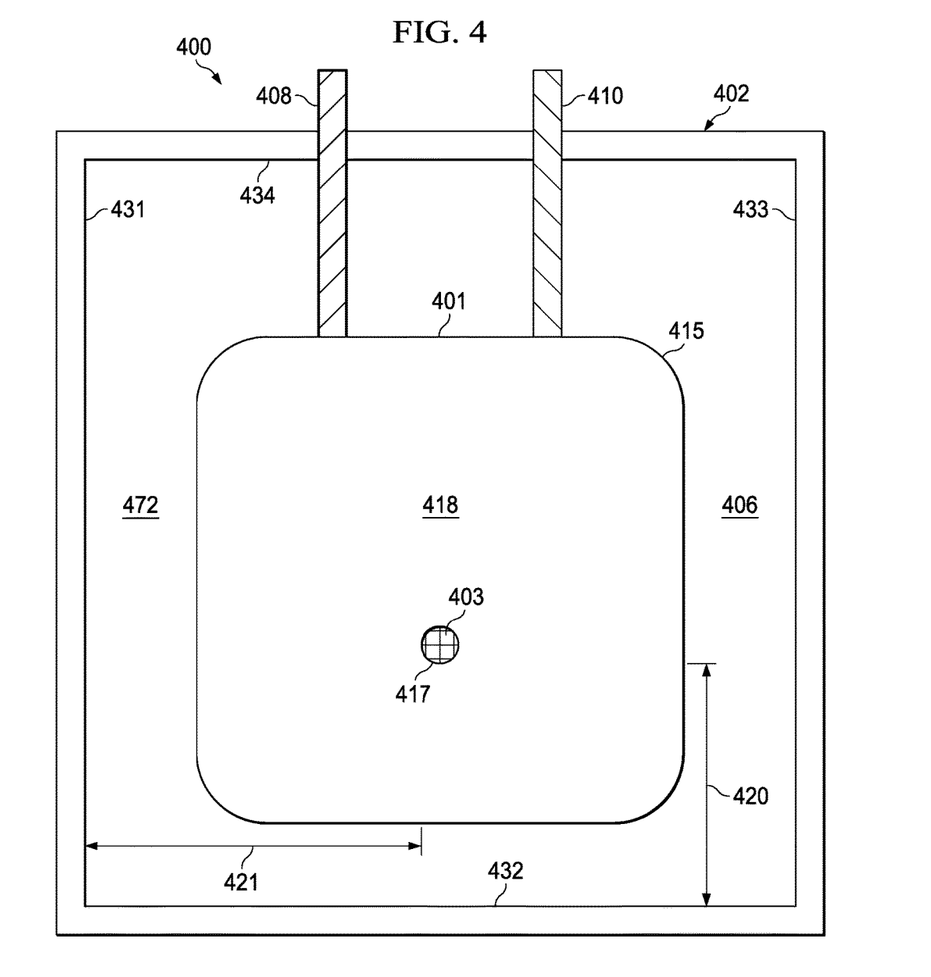
FIG. 4 is an illustration of a cross-sectional view of a capacitor in accordance with an advantageous embodiment.

With reference now to FIG. 4, an illustration of a diagram of a capacitor is depicted in accordance with an advantageous embodiment. In this example, capacitor 400 is an example of a physical implementation for capacitor 301 shown in block form in FIG. 3. Capacitor 400 may operate at a voltage potential of at least about 10,000 volts.

In this illustrative example, capacitor 400 includes plate 401, enclosure 402, spacer 403, and dielectric material 406. Enclosure 402 is depicted as a substantially rectangular structure having second side wall 431, first side wall 433, bottom 432, and top 434. Enclosure 402 further defines volume 472 wherein dielectric material 406 is positioned.

Plate 401 is also positioned in an interior region of enclosure 402. As FIG. 4 depicts a side cutaway view of capacitor 400, a second plate may be positioned behind plate 401, although that second plate is not illustrated. Cathode connector 408 and anode connector 410 extend from plate 401 and a second plate (not shown), respectively. Cathode connector 408 and anode connector 410 provide electrical connections between the interior region of capacitor 400 to the exterior region. Plate 401 is depicted as substantially planar. Plate 401 thus defines area 418. Plate 401 is also depicted in this advantageous embodiment as having substantially rounded corners 415.

Plate 401 also defines hole 417. Spacer 403 is positioned partially within hole 417. Spacer 403 provides a substantially even spacing between plate 401 and other plates. Spacer 403 is positioned at height 420 as measured from bottom 432 of enclosure 402, and spacer 403 is positioned at width 421 as measured from first side wall 433 of enclosure 402. As depicted, spacer 403 is positioned at a substantially equal distance from first side wall 433 and second side wall 431. In terms of a vertical positioning, spacer 403 is positioned at height 420 that is about one-third up from bottom 432 of the total height 420 of enclosure 402. Other positioning of spacer 403 may be used. Also, multiple spacers may be used, although only one spacer is shown in FIG. 4.

Figure 5:
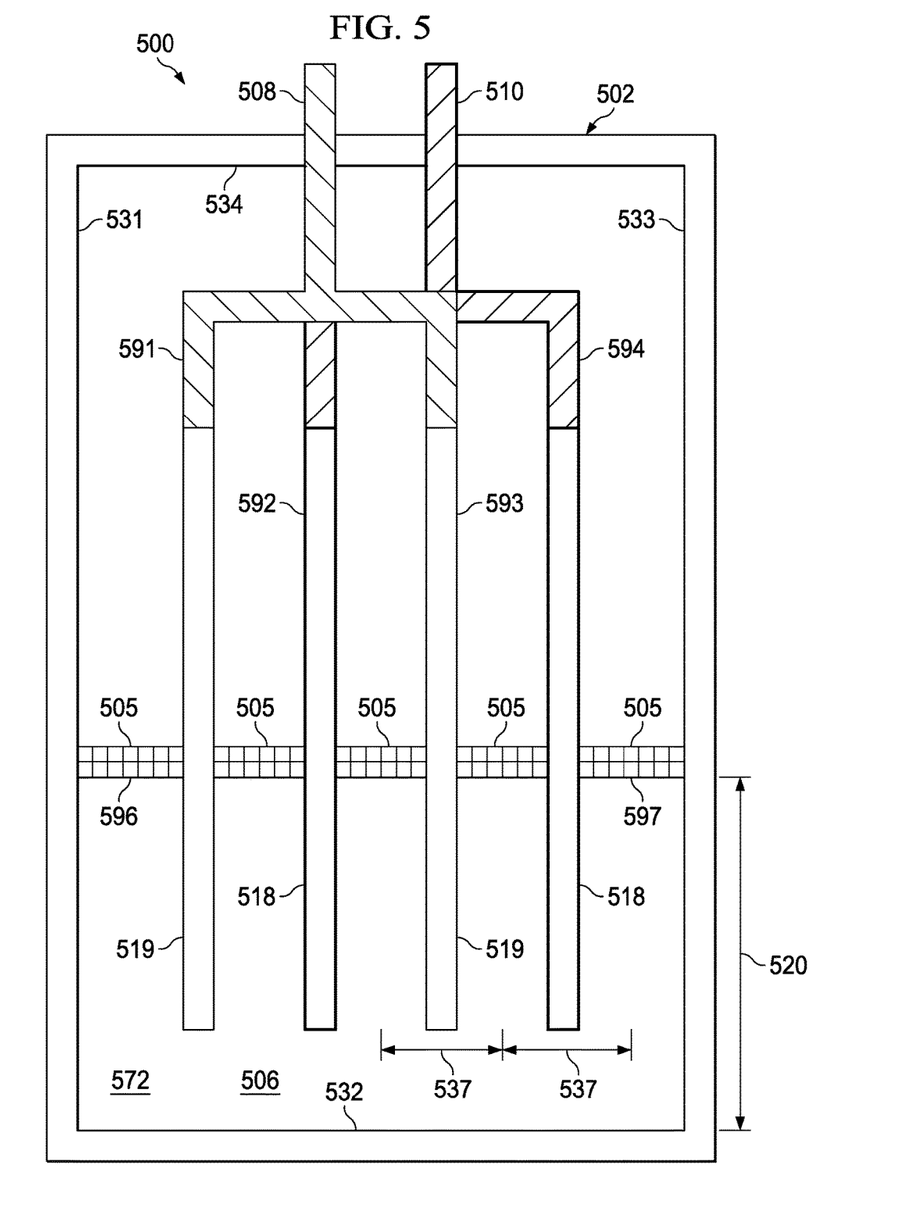
FIG. 5 is an illustration of a cross-sectional view of a capacitor in accordance with an advantageous embodiment.

Turning now to FIG. 5, an illustration of a capacitor is depicted in accordance with an advantageous embodiment. In this example, capacitor 500 is an example of a physical implementation of capacitor 301 shown in block form in FIG. 3. FIG. 5 further illustrates a cross-sectional view rotated 90 degrees, as compared to the depiction in FIG. 4.

In the illustrative example, capacitor 500 includes enclosure 502. Enclosure 502 includes bottom 532, first side wall 531, second side wall 533, and top 534. Enclosure 502 also defines volume 572, which is filled with dielectric material 506. A plurality of plates is also arranged within the interior of capacitor 500.

Four plates are shown in FIG. 5, although a different number may be present. Two anode plates 518 are interleaved with two cathode plates 519. Cathode connector 508 connects with each of cathode plates 519 and extends to the exterior of enclosure 502. Anode connector 510 connects with each of anode plates 518 and extends to the exterior of enclosure 502. The plates are substantially planar in shape.

Spacers 505 are positioned between anode plates 518 and cathode plates 519 so as to provide spacing 537 between the plates that is substantially even. It is noted that a spacer is placed between first cathode plate 591 and first anode plate 592. A second spacer is placed between first anode plate 592 and second cathode plate 593. Additionally, a third spacer is placed between second cathode plate 593 and second anode plate 594. First wall spacer 596 is placed between first side wall 531 and first cathode plate 591, and second wall spacer 597 is placed between second anode plate 594 and second side wall 533. Each of spacers 505 is shown at a similar height 520 from bottom 532, although other heights and configurations are possible.

FIG. 5 illustrates an embodiment wherein the spacing between first cathode plate 591, first anode plate 592, second cathode plate 593, and second anode plate 594 is also substantially equivalent to the spacing between the plates and first side wall 531 and second side wall 533. However, in other advantageous embodiments, the spacing between a plate and a wall may be different from the spacing between two plates. Thus, the spacer between two plates may be a different size from the size of a spacer positioned between a plate and a wall.

Spacers 505 do not appreciably affect the electric field where spacers 505 are present because of the porosity of spacers 505. Dielectric material 506 penetrates the pores of spacers 505. Once saturated with dielectric material 506, spacers 505 function electrically, substantially similar to the surrounding dielectric material. A substantially similar function is a function such that the capacitor may operate at a voltage at least about 10,000 volts with a decreased incidence of breakdown.

Figure 6:
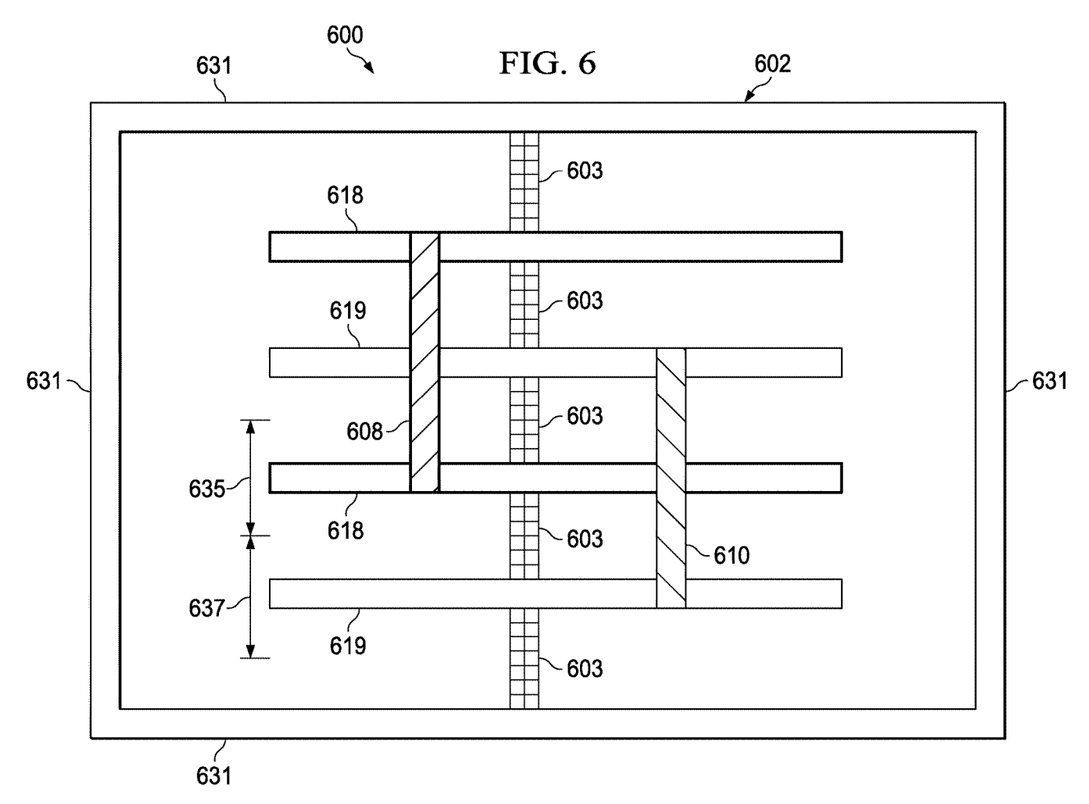
FIG. 6 is an illustration of a top view of a capacitor in accordance with an advantageous embodiment.

Turning now to FIG. 6, an illustration of a capacitor is depicted in accordance with an advantageous embodiment. In this example, capacitor 600 is an example of a physical implementation of capacitor 301 shown in block form in FIG. 3. FIG. 6 further illustrates a top-cutaway view of a capacitor, such as a top cutaway corresponding to FIG. 4.

In the illustrative example, capacitor 600 includes enclosure 602 with four walls 631. Anode plates 618 and cathode plates 619 are shown in an interleaved configuration. Anode connector 608 connects anode plates 618, and cathode connector 610 connects cathode plates 619. Spacer 603 is positioned between anode plates 618 and cathode plates 619, as well as between the two end plates and four walls 631. Spacer 603 is positioned substantially in the middle of anode plates 618 and cathode plates 619, although other positioning is possible. Spacer 603 also maintains plates at a substantially even spacing 635. Spacer 603 also maintains a desired standoff 637 between anode plates 618, cathode plates 619, and four walls 631.

Figure 7:
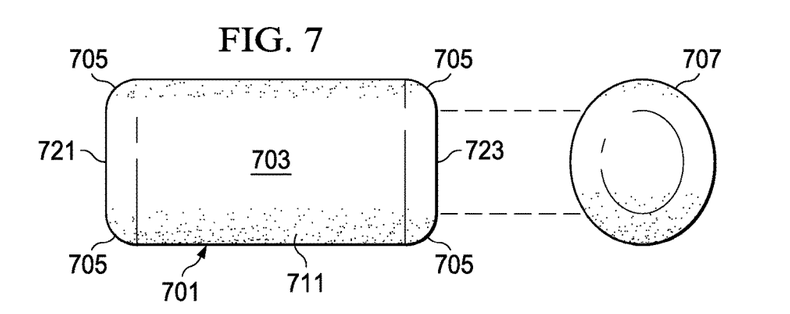
FIG. 7 is an illustration of a side view of a spacer in accordance with an advantageous embodiment.

Referring now to FIG. 7, an illustration of a spacer is depicted in accordance with an advantageous embodiment. In this example, spacer 701 is an example of a physical implementation of spacer 309 shown in block form in FIG. 3.

In the illustrative example of FIG. 7, spacer 701 is shown having a number of features. Spacer 701 is substantially cylindrical in shape with rounded profile 707. Additionally, spacer 701 includes rounded corner 705 at each corner of spacer 701. Spacer 701 also includes first end 721 and second end 723. First end 721 and second end 723 are substantially flat. First end 721 and second end 723 are configured to be able to make substantially-uniform contact along their surfaces with a substantially planar plate, for example, as shown in FIGS. 5 and 6.

Spacer 701 also includes interior 703. Interior 703 comprises a plurality of pores 711. Pores 711 are open-celled pores that allow for the transfer of materials, such as a dielectric material, from the exterior of spacer 701 to interior 703.

As depicted in FIG. 7, spacer 701 is substantially cylindrical in shape. However, other shapes are possible. For example, the cylindrical shape is depicted as a cylinder with a substantially even cylinder diameter. However, the shape may vary in diameter. An ellipse-shaped body may be used. The ellipse-shaped body is generally wider in diameter in a center portion and narrow in diameter at the two ends. A spacer with an ellipse-shaped body also includes substantially flat ends.

Figure 8:
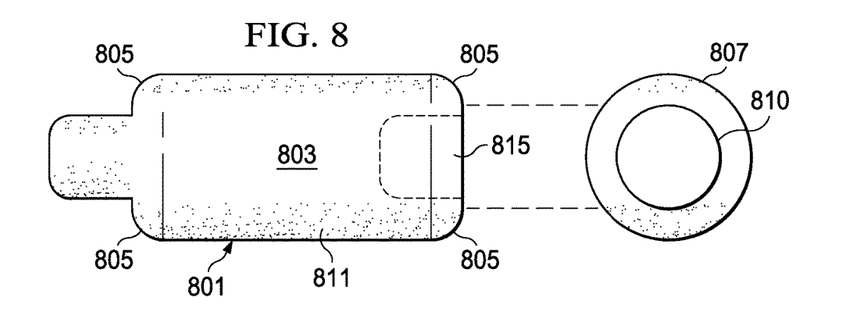
FIG. 8 is an illustration of a side view of a spacer in accordance with an advantageous embodiment.

Referring now to FIG. 8, an illustration of a spacer is depicted in accordance with an advantageous embodiment. In this example, spacer 801 is a further example of a physical implementation of spacer 309 shown in block form in FIG. 3.

Spacer 801 includes some features similar to spacer 701 depicted in FIG. 7. For example, spacer 801 includes cylindrical profile 807 with rounded edges 805. Additionally, spacer 801 also includes pores 811 in interior 803. Pores 811 are open-celled pores that allow for the saturation of the dielectric material therein.

Additionally, spacer 801 includes alignment features that allow a first spacer to be attached to a second spacer. Spacer 801 includes pin 810 and recess 815. Pin 810 may take the form of a generally cylindrical protuberance that extends from an end of spacer 801. Recess 815 is a reciprocally-shaped area that is configured to receive pin 810. In this manner, two or more spacers may be connected by connecting pin 810 from a first spacer with recess 815 in a second spacer.

Referring again to FIGS. 4-6, the spacers in these figures may be connected using the alignment features illustrated in FIG. 8. Spacers may pass through hole 417 in FIG. 4 in a plate to interconnect with other spacers. Spacer 801 may also be formed with pin 810 at each end or recess 815 at each end in FIG. 8. Such a configuration may be used to resolve geometric conflicts among spacers.

Figure 9:
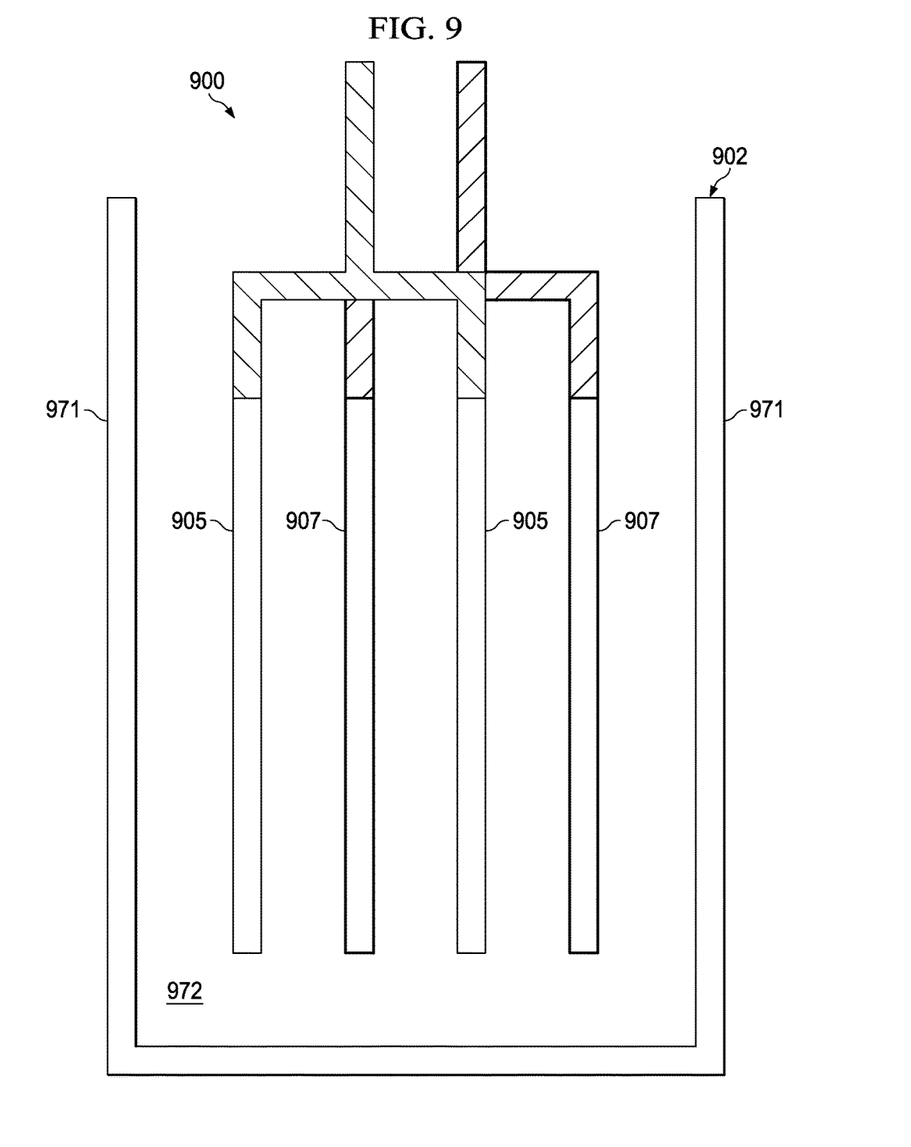
FIG. 9 is an illustration of a partially-assembled capacitor in accordance with an advantageous embodiment.

Referring now to FIG. 9, an illustration of a partially-assembled capacitor is depicted in accordance with an advantageous embodiment. Assembly 900 is an example of capacitor 301 partially-assembled, as depicted in block form in FIG. 3. Assembly 900 includes enclosure 902, anode plates 905, and cathode plates 907. Anode plates 905 and cathode plates 907 are hung or positioned within enclosure 902 through means as known in the art. Enclosure 902 may include five walls 971. A top wall may be left open or unsecured at this point of the assembly in order to allow further positioning of other components within enclosure 902. Enclosure 902 defines volume 972. However, at this point in the assembly, volume 972 is substantially empty except for anode plates 905 and cathode plates 907.

Figure 10:
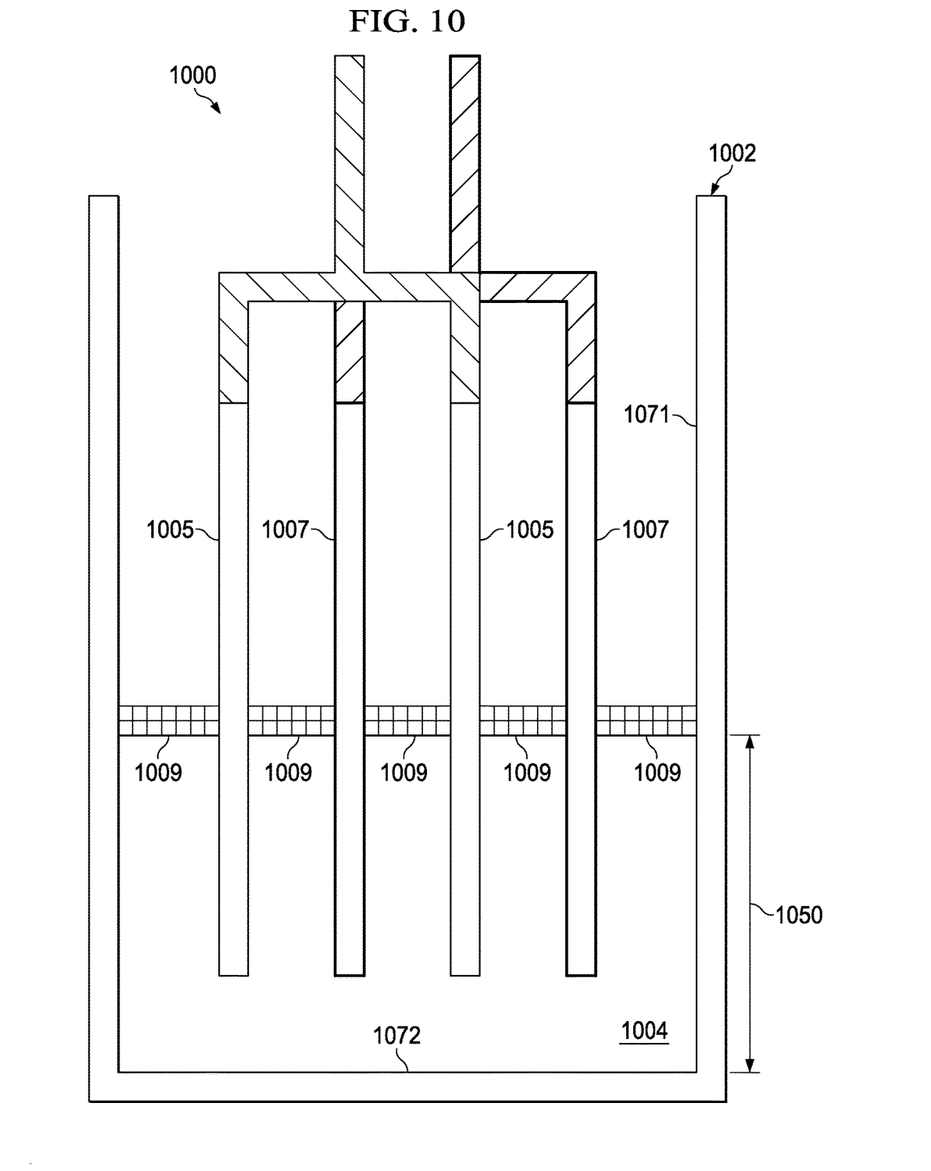
FIG. 10 is an illustration of a partially-assembled capacitor in accordance with an advantageous embodiment.

Referring next to FIG. 10, an illustration of a partially-assembled capacitor is depicted in accordance with an advantageous embodiment. Assembly 1000 is an example of a partially-assembled capacitor, such as capacitor 301 as depicted in block form in FIG. 3. Assembly 1000 is similar to assembly 900 in FIG. 9. However, in FIG. 10, spacers 1009 have now been positioned between the plates. Spacers 1009 are positioned at a desired height 1050 from bottom wall 1072 of enclosure 1002. Spacers 1009 are positioned to maintain plates 1005 and 1007 at a substantially even spacing between each other. Spacers 1009 are also positioned to maintain a substantially even spacing between plates 1005, 1007, and wall 1071 of enclosure 1002.

Spacers 1009 may be hung or positioned in different manners. Spacers 1009 may be interconnected using alignment features as illustrated in FIGS. 7 and 8. Additionally, spacers 1009 may be hung in a desired place using other hangers and brackets as is known in the art.

Spacers 1009 may be substantially filled with dielectric material at the point of assembly depicted in FIG. 10. The dielectric material is positioned within spacer 1009 to substantially fill the open pores within spacers 1009.

FIG. 10 only represents a partially-assembled capacitor, and further processing steps, as described herein, may be performed with respect to the assembly in FIG. 10 so as to obtain a capacitor, such as capacitor 301 as depicted in block form in FIG. 3.

When filling spacers 1009 with dielectric material, it is generally desired to avoid bubbles or air pockets in the dielectric material, as this can lead to anomalies in the electric field, which can lead to a breakdown. With some dielectric materials, it may be sufficient to achieve this using capillary action to draw the dielectric material into spacers 1009. With other more viscous dielectric material, the dielectric material may be drawn into spacers 1009 by use of pressure, such as a vacuum differential, placed across spacers 1009 to fully charge spacers 1009 with dielectric material and avoid bubbles. It is possible to load spacers 1009 with dielectric material separately from the loading of volume 1004 with dielectric material.

Figure 11:
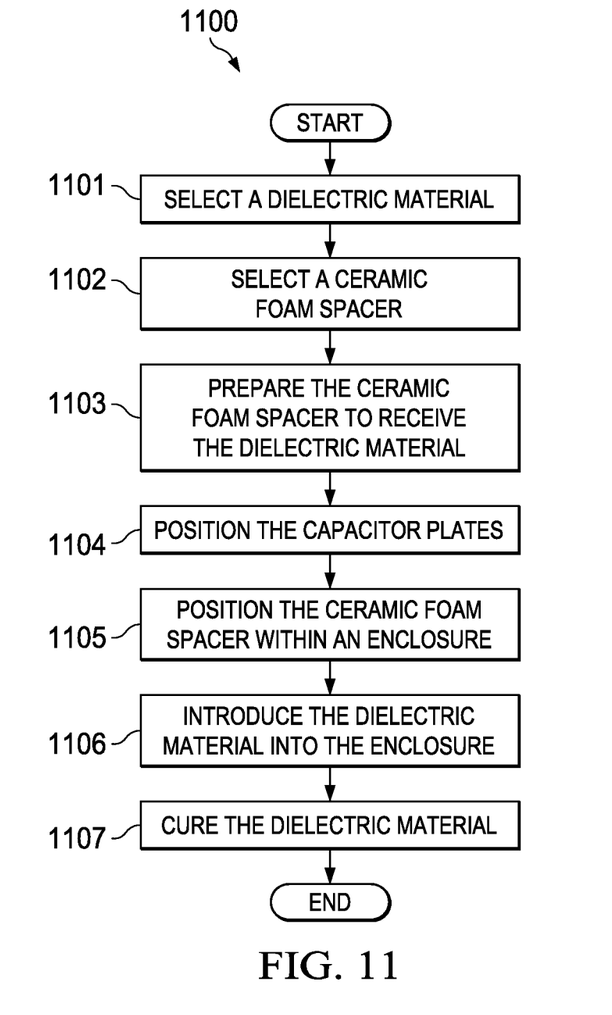
FIG. 11 is an illustration of a flowchart of a process for manufacturing a capacitor in accordance with an advantageous embodiment.

With reference now to FIG. 11, an illustration of a flowchart of a process for manufacturing a capacitor is depicted in accordance with an advantageous embodiment. The process is generally designated by reference number 1100. One example of the process may be manufacturing a capacitor, such as depicted in FIG. 3, and the following reference numbers will track the structure and features of that figure.

Process 1100 may begin by selecting dielectric material 311 (operation 1101). Dielectric material 311 will be chosen in one aspect for its function in capacitor 301. Dielectric material 311 interacts with first plate 305 and second plate 307 in a manner to allow for voltage 316, rapid discharge 317, and rapid charge 319 at desired levels. Dielectric material 311 may be selected to include particles 382 that will be characterized by particle size 384. Dielectric material 311 will also be characterized by viscosity 381. Viscosity 381 may affect how dielectric material 311 will be loaded into spacer 309 as further described herein.

Next, the process may select ceramic foam spacer 352 (operation 1102). Ceramic foam spacer 352 is a ceramic foam material in the form of a spacer. Ceramic foam spacer 352 comprises pores with open cells. The open-celled pore structure allows fluids, such as dielectric material, to penetrate ceramic foam spacer 352. Further, ceramic foam spacer 352 is characterized by a high level of open volume. A typical percentage of open volume compared to total volume is above about 85 percent. Ceramic foam spacer 352 may comprise a number of compounds including, for example, oxides of aluminum and silicon.

Next, the process prepares ceramic foam spacer 352 to receive dielectric material 311 (operation 1103). The preparation may take the step of rinsing the ceramic foam material with solvents to remove soluble material. Solvents may include known solvents, such as xylene. The preparation may further take the form of a bakeout. A bakeout includes heating ceramic foam spacer 352. A heating operation may include heating ceramic foam spacer 352 at a temperature in excess of about 200 degrees Celsius for at least about two hours. The heating may occur in a vacuum or partial-vacuum environment.

Alternatively, the heating may occur without the presence of oxygen, such as in a nitrogen environment. In the bakeout operation, it is desired to remove water and volatile materials from the ceramic spacer material.

The process may then position the capacitor plates (operation 1104). In this step, first plate 305 and second plate 307 are positioned within the interior of volume 372 of enclosure 303. First plate 305 and second plate 307 may be hung using known methods. Connectors may also be attached to first plate 305 and second plate 307.

Next, the process may position ceramic foam spacer 352 within enclosure 303 (operation 1105). Ceramic foam spacer 352 is positioned between first plate 305 and second plate 307 to maintain a substantially even spacing between them. First plate 305 and second plate 307 may be substantially planar so that placement of ceramic foam spacer 352 between the plates sets the spacing. A number of spacers in ceramic foam spacers 352 may be positioned between first plate 305 and second plate 307 to maintain a robust separation and spacing of the plates. Where multiple plates are used, a number of ceramic in ceramic foam spacers 352 may be interconnected.

The process may then introduce dielectric material 311 into enclosure 303 (operation 1106). Dielectric material 311 may be introduced by known methods, such as pouring or pumping. A low agitation pumping may be desired to minimize air pockets in dielectric material 311. To assist with the operation of introducing dielectric material 311, dielectric material 311 may also be heated to a level sufficient to decrease viscosity, but not heated so much to induce curing of dielectric material 311. It is desired that dielectric material 311 substantially fills the area between first plate 305 and second plate 307. It is also desired that dielectric material 311 substantially fills pores 357 within ceramic foam spacer 352.

Next, the process may cure dielectric material 311 (operation 1107), with the process terminating thereafter. This step may be achieved by heating dielectric material 311 to a sufficiently-high temperature for a sufficient amount of time to induce curing of dielectric material 311. The parameters of time and temperature will vary, depending on the dielectric material used, as well as volumes of material. After a sufficient time, dielectric material 311 is allowed to cool. Curing of dielectric material 311 may, in some materials, transform dielectric material 311 from a generally liquid phase to a substantially solid phase.

Figure 12:
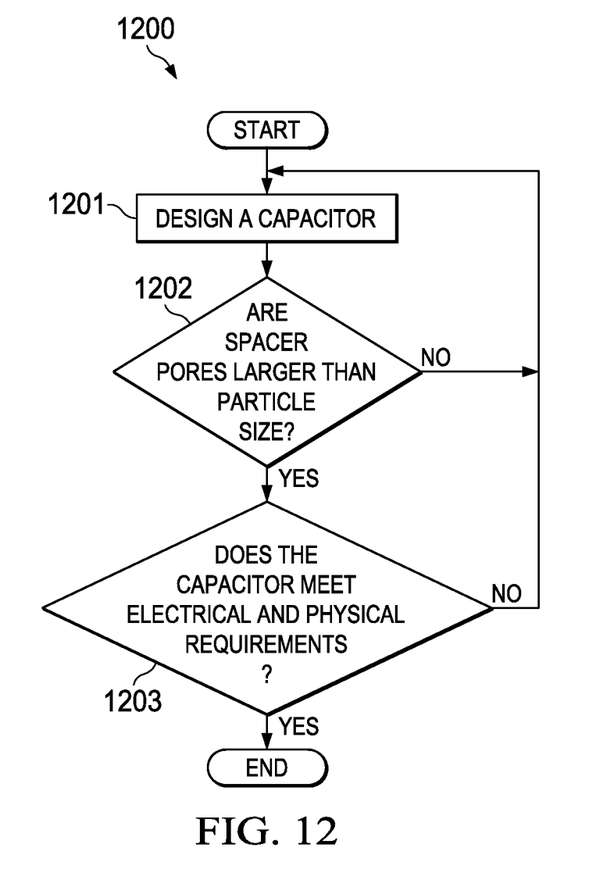
FIG. 12 is an illustration of a flowchart of a process for designing a capacitor in accordance with an advantageous embodiment.

Referring next to FIG. 12, an illustration of a flowchart of a process for designing a capacitor is depicted in accordance with an advantageous embodiment. The process is generally designated by reference number 1200. One example of the depicted process may be designing a capacitor, such as capacitor 301 in FIG. 3, and the following reference numbers will track the structure and features of that figure.

The process may begin with designing capacitor 301 (operation 1201). Designing capacitor 301 includes selection of dielectric material 311 and spacer 309. Spacer 309 is characterized by pore size 358.

Next, the process compares pore size 358 of spacer 309 to particle size 384 of particles 382 in dielectric material 311 (operation 1202). If pore size 358 of spacer 309 is greater than particle size 384, then particles 382 will be able to migrate to the interior of spacer 309. The process can continue to the next step. However, if pore size 358 is less than particle size 384, then particles 382 will be unable to enter into pores 357. Dielectric material 311 and ceramic foam spacer 352 are incompatible. The design process must begin again at operation 1201.

Next, the process determines whether capacitor 301 will meet electrical and physical requirements (operation 1203). If capacitor 301 meets the requirements, then this design operation is complete. If capacitor 301 does not meet the requirements, then the process returns to operation 1201.

The flowcharts and block diagrams in the different depicted embodiments illustrate the architecture, functionality, and operation of some possible implementations of apparatuses and methods in an advantageous embodiment. In this regard, each block in the flowcharts or block diagrams may represent a module, segment, function, and/or a portion of an operation or step.

In some alternative implementations of an advantageous embodiment, the function or functions noted in the block may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

In an advantageous embodiment of the disclosure described herein, a capacitor is provided with an energy density of at least about two joules/cm$^3$. The capacitor includes an enclosure that defines a volume, such as a chamber. A first plate and a second plate, each of which may be substantially planar, are positioned within the volume. The plates may be an anode and a cathode. At least one spacer is positioned between the plates, and the spacer maintains the plates at a substantially even spacing. A dielectric material is positioned within the volume and is also positioned so as to substantially fill the pores of the spacer. The dielectric material may be cured so as to transition to a substantially solid form. Connectors attached to the plates allow voltage to discharge and charge the first plate and the second plate.

In an advantageous embodiment, the configuration of the capacitor allows the capacitor to charge a voltage of at least about 10,000 volts. Further, the capacitor allows the voltage to be discharged and then charged at a desired rate. The capacitor may operate with a rate of discharge from less than about one microsecond to about 10 microseconds and with a rate of charge from about one microsecond to about 10 milliseconds. The rates of charge and discharge are sufficiently high to allow the capacitor to function as an energy storage device where the rapid charge and discharge of high voltage is desired. The capacitor may function, for example, in energy weapons systems and radar systems.

In an advantageous embodiment, the configuration of the capacitor also provides an energy density of at least about two joules/cm$^3$. The energy density of the capacitor enables the capacitor to provide relatively high levels of energy with a low weight. The energy density also allows the capacitor to function in an airborne environment or in an airborne system where low weight is desired.

In an advantageous embodiment, the configuration of the capacitor also decreases the incidence of capacitor breakdown. The configuration also increases the voltage and energy performance of the capacitor, while maintaining capacitor breakdown at acceptable limits. The configuration maintains the anode and cathode plates of a capacitor at a substantially even spacing. This minimizes any points of relative proximity between the plates so as to decrease possible breakdown. Further, the highly porous nature of the spacer allows the spacer to become saturated with dielectric material. Consequently, the area around the spacer also functions electrically in a manner substantially similar to that of the dielectric material itself. Thus, minimal anomalies or electrical discontinuities are presented by the spacer, as compared to the dielectric material, which could lead to breakdown. The configuration provides the advantage of substantially even spacing between capacitor plates without any significant sacrifice in the electric field of the dielectric material.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    a first plate, being an anode plate, and a second plate, being a cathode plate, wherein the anode plate and the cathode plate hold a voltage potential of at least about 10,000 volts;
    a spacer comprising a material having a plurality of pores, being open pores, wherein the spacer is located between the first plate and the second plate, wherein the spacer is characterized by an open volume of at least about 85 percent by total volume;
    a dielectric material located within the plurality of pores of the spacer, wherein a first dielectric performance of the spacer about matches a second dielectric performance of the dielectric material; and
    an enclosure, wherein the first plate, the second plate, and the spacer are located within the enclosure, the enclosure defining a volume, wherein the enclosure further defines a wall, and wherein the spacer is disposed between the wall and one of the first plate and the second plate.

2. The apparatus of claim 1, wherein the spacer comprises a ceramic material.

3. The apparatus of claim 1, wherein the spacer comprises a ceramic foam material.

4. The apparatus of claim 3, wherein the ceramic foam material is selected from a group consisting of compounds of aluminum, silicon, and boron.

5. The apparatus of claim 3, wherein the spacer has a shape that is substantially cylindrical.

6. The apparatus of claim 5, wherein the spacer has substantially rounded edges.

7. The apparatus of claim 1, wherein the spacer positions the first plate at a set distance from the second plate, and wherein the set distance is substantially equal along an area of the first plate and the second plate.

8. The apparatus of claim 1 wherein the dielectric material comprises a cured dielectric material.

9. The apparatus of claim 1, wherein the pores have a volume above 90 percent compared to a total volume of the spacer.

10. The apparatus of claim 1, wherein the dielectric material comprises dielectric particles having a particle size, and wherein the particle size does not exceed a pore size of the plurality of pores.

11. The apparatus of claim 10 wherein the dielectric particles are evenly dispersed within the spacer.

12. A method for manufacturing a capacitor, the method comprising the steps of:
    positioning a spacer between a first plate and a second plate, the first plate comprising an anode plate and the second plate comprising a cathode plate, the spacer characterized by an open-pored material having a plurality of pores;

filling an enclosure with a dielectric material, the spacer, the first plate, and the second plate positioned within the enclosure, wherein the enclosure further defines a wall, and wherein the spacer is disposed between the wall and one of the first plate and the second plate; and filling the plurality of pores of the spacer with the dielectric material, wherein a first dielectric performance of the spacer about matches a second dielectric performance of the dielectric material, wherein filling the plurality of pores of the spacer with the dielectric material occurs prior to positioning the spacer between the first plate and the second plate, and wherein the step of filling the pores of the spacer comprises filling by capillary action.

13. The method of claim 12 further comprising the step of curing the dielectric material.

14. The method of claim 12, wherein the step of filling the pores of the spacer further comprises applying a vacuum.

15. The method of claim 12 further comprising heating the spacer at a temperature of at least about 200 degrees Celsius, for at least about two hours.

16. The method of claim 15, wherein the step of heating the spacer comprises heating the spacer at the temperature of at least about 300 degrees Celsius, for at least about four hours.

17. The method of claim 15, wherein the step of heating the spacer further comprises exposing the spacer to a vacuum.

18. A method for manufacturing a capacitor, the method comprising:

positioning a spacer between a first plate, comprising an anode plate, and a second plate, comprising a cathode plate, of the capacitor, wherein the spacer has pores;

forming a dielectric material within the pores of the spacer, wherein a first dielectric performance of the spacer about matches a second dielectric performance of the dielectric material, wherein the step of forming the dielectric material within the spacer comprises:
  filling the pores with the dielectric material in an uncured form; and
  curing the dielectric material in the spacer to cause the dielectric material to solidify, wherein filling the pores with the dielectric material in the uncured form occurs prior to positioning the spacer between the first plate and the second plate; and curing the dielectric material in the spacer to cause the dielectric material to solidify occurs after the spacer is positioned between the first plate and the second plate; and forming an enclosure, the first plate, the second plate, and the spacer located within the enclosure, the enclosure defining a volume, wherein the enclosure further defines a wall, wherein the spacer is disposed between the wall and one of the first plate and the second plate.

19. The method of claim 18, wherein filling the pores with the dielectric material in the uncured form and curing the dielectric material in the spacer to cause the dielectric material to solidify occurs after the spacer is positioned between the first plate and the second plate.

20. The method of claim 18, wherein the dielectric material in the uncured form is a liquid.

* * * * *